United States Patent [19]
Chadha

[11] Patent Number: 6,004,480
[45] Date of Patent: Dec. 21, 1999

[54] PHOSPHOR MANUFACTURING PROCESS EMPLOYING AUTO FEEDBACK TO CONTROL PRODUCT CHARACTERISTICS

[75] Inventor: Surjit S. Chadha, Meridian, Id.

[73] Assignee: Micron Technology, Inc., Boise, Id.

[21] Appl. No.: 08/740,873

[22] Filed: Nov. 4, 1996

[51] Int. Cl.$^6$ .................................. B01J 8/15; B01J 8/00
[52] U.S. Cl. .......................... 252/301.4 R; 252/301.45; 252/301.4 F; 252/301.4 P; 252/301.4 H; 252/301.6 R; 252/301.6 S; 252/301.6 P; 252/301.6 F; 252/301.5; 34/259; 34/264; 264/432; 264/489
[58] Field of Search ................ 252/301.4 R, 301.4 S, 252/301.6 R, 301.6 P, 301.6 F, 301.4 F, 301.6 S, 301.5, 301.4 P, 301.4 H; 34/259, 264; 75/10.1, 10.13; 204/157.45; 219/678, 702, 714, 756; 264/432, 489; 432/58

[56] References Cited

U.S. PATENT DOCUMENTS 3,923,682 12/1975 Dale et al. ..................... 252/301.4 R
5,464,568 11/1995 Bringley et al. ................ 252/301.4 H

OTHER PUBLICATIONS

Yuan Ying Li et al, "Properties of (Y,Gd)BO3:Eu3+ Phosphors synthesized by Microwave Heating Method", Chinese Chemical Letters, vol. 7, No. 4, pp. 387–388, 1996.
Chemical Abstracts citation 124:273466 Yuan Ying Li et al, "Synthesis of Gd2O3:Eu3+ phosphors With Method of Microwave Heating", 1995.
Chemical Abstracts citation 123:211844 Yuan Ying Li et al, "Synthesis of Y2O3:Eu3+ With Method of Microwave Heating", 1995.
Chemical Abstracts citation 128:250468, Chinese Patent 1,141,946, Feb. 5, 1997.

Primary Examiner—C. Melissa Koslow
Attorney, Agent, or Firm—Rodney F. Brown

[57] ABSTRACT

A continuous automated process is provided for manufacturing a phosphor product having controlled particle size characteristics and enhanced luminescent performance characteristics for use in a luminescent display. A precursor host lattice solution, a precursor dopant solution and reagent solution are initially selected as the starting materials for the phosphor product and are mixed together to produce a liquid starting material mixture. The mixture is conveyed to a microwave reactor and heated therein in a first heating stage by subjecting the mixture to microwaves at a predetermined frequency for a time sufficient to convert the starting material mixture to a precursor complex. The precursor complex is conveyed to a fluidized bed reactor and heated therein in a second heating stage by a hot fluidizing gas for a time and at a temperature sufficient to convert the precursor complex to the phosphor product in particulate form. The instantaneous particle size characteristics of the phosphor product are determined and transmitted to an autofeedback controller that adjusts the microwave frequency and reactor residence time of the first heating stage in response to the particle size data, thereby automatically tailoring the specific particle size characteristics of the phosphor product to the requirements of the practitioner. The instantaneous photoluminescent characteristics of the phosphor product are also determined and transmitted to another autofeedback controller that adjusts the amount of the dopant precursor solution fed to the starting material mixture in response to the photoluminescent data, thereby automatically tailoring the specific photoluminescent characteristics of the phosphor product to the requirements of the practitioner. In an alternate embodiment the precursor complex is retained in the microwave reactor for the second heating stage, rather than performing the second heating stage in the fluidized bed reactor.

26 Claims, 2 Drawing Sheets

PHOSPHOR MANUFACTURING PROCESS EMPLOYING AUTO FEEDBACK TO CONTROL PRODUCT CHARACTERISTICS

This invention was made with Government support under Contract No. DABT63-93-C-0025 awarded by Advanced Research Projects Agency (ARPA). The Government has certain rights in this invention.

TECHNICAL FIELD

The present invention relates generally to the manufacture of phosphors, and more particularly to a manufacturing process employing auto feedback to produce phosphors having enhanced utility in luminescent display applications.

BACKGROUND OF THE INVENTION

Luminescent materials, termed phosphors, have general utility in luminescent displays. A phenomenon common to all phosphors is their ability to emit photons that are visible to the human eye when the phosphors are excited to elevated energy levels. One excitation technique employed in many luminescent displays, including cathode ray tubes, vacuum fluorescent displays, and field emission displays, projects electrons through a vacuum onto a display screen from an electron-emitting cathode positioned proximal to the display screen. When the cathode is activated, electrons traveling from the cathode strike phosphors positioned on the display screen. The electrons are reflected, scattered or absorbed on contact with the display screen. The incident electrons transfer energy to the phosphors, thereby exciting the phosphors and advantageously causing them to emit visible light. By selectively exciting the phosphors in a given pattern, an image can be created on the display screen.

Other types of luminescent displays rely on substantially the same principle as described above to create images on the display screen, but excite the phosphors by alternate forms of energy, such as x-rays, gamma rays, and ultraviolet, to name a few. In any case, many luminescent displays, including cathode ray tubes, field emission displays and plasma displays, require high resolution display screens for optimum performance. It has been found that screen resolution is inter alia a function of the average phosphor particle size and the phosphor particle size distribution. In particular, it has been found that extremely fine grain phosphors having a relatively small average particle size and a narrow particle size distribution are a prerequisite for satisfactory high resolution display screens.

The conventional method for manufacturing phosphors is to mix the phosphor starting materials in dry particulate form and fire the resulting mixture in an oven or a kiln at a high temperature, transforming the starting materials to the desired phosphor composition. This method, however, produces large grain phosphors having a relatively large average particle size and a wide particle size distribution, characteristics that are unsatisfactory for high resolution display screen applications. Accordingly, the large grain phosphors produced in this manner are mechanically sized by milling, crushing and sieving, or other such means to obtain the desired fine grain phosphors. Unfortunately, mechanical sizing of the phosphor particles diminishes the luminescent efficiency of the resulting fine grain phosphors, correspondingly diminishing the luminance of display screens employing such phosphors. In addition, the resolution of such display screens is also often diminished since a high current density may be required to achieve the requisite luminance of the display screens.

As such, a need exists for extremely fine grain phosphors having satisfactory performance characteristics for use in high resolution display screen applications. Accordingly, it is an object of the present invention to provide a process for manufacturing a phosphor that satisfies the performance demands of high resolution display screens. It is another object of the present invention to provide a process for manufacturing a phosphor that enables precise control of the particle size and luminescent characteristics of the resulting phosphor. More particularly, it is an object of the present invention to provide a process for manufacturing an extremely fine grain phosphor that does not require mechanical sizing of the phosphor product which would diminish the luminescent efficiency thereof. These objects and others are accomplished in accordance with the invention described hereafter.

SUMMARY OF THE INVENTION

The present invention is a continuous automated process for manufacturing a phosphor product having controlled particle size characteristics and enhanced luminescent performance characteristics for use in a luminescent display, and specifically for use in a high resolution display screen of a luminescent display. The phosphor product produced by the present process comprises a host lattice infiltrated by at least one dopant that activates the luminescent properties of the phosphor product.

In accordance with the present process, a precursor solution of a conventional host lattice and a precursor solution of a conventional dopant are initially selected as starting materials for the desired phosphor product. A host lattice precursor feed device is activated to meter a measured portion of the selected host lattice precursor solution into a mixing chamber and a dopant precursor feed device is likewise activated to meter a measured portion of the selected dopant precursor solution into the mixing chamber. A reagent solution is also selected to facilitate formation of the desired phosphor product, a measured portion of which is similarly metered into the mixing chamber via a reagent solution feed device. The host lattice precursor, dopant and reagent solutions are mixed together in the mixing chamber to produce a substantially contaminant-free liquid starting material mixture.

The starting material mixture is conveyed to a microwave reactor providing a first heating stage which subjects the starting material mixture to microwaves emitted in the microwave reactor at a predetermined frequency. The first heating stage heats the starting material mixture for a first heating stage residence time and to a first heating stage temperature which are sufficient to convert the starting material mixture to a precursor complex. A second heating stage is provided which subsequently heats the precursor complex for a second heating stage residence time and to a second heating stage temperature which are sufficient to convert the precursor complex to the phosphor product in particulate form. The phosphor product is conveyed to a sampling device and a representative sample of the phosphor product is conveyed from the sampling device to a particle size measuring device. The instantaneous particle size characteristics of the phosphor product are determined, including the average particle size and the particle size distribution thereof. The resulting particle size data is transmitted to an autofeedback controller in communication with the microwave reactor which adjusts the first heating stage temperature or the first heating stage residence time in response to the particle size characteristics, thereby automatically tailoring the specific particle size characteristics of the phosphor product to the requirements of the practitioner.

Another sample of the phosphor product is simultaneously conveyed in parallel from the sampling device to a photoluminescent measuring device to determine the instantaneous photoluminescent characteristics of the phosphor product, including the photoluminescent efficiency thereof. The resulting photoluminescent data is transmitted to an autofeedback controller in communication with the dopant precursor feed device which adjusts the amount of the dopant precursor solution metered to the mixing chamber, and correspondingly the relative concentrations of the host lattice and the dopant precursor in the starting material mixture, in response to the photoluminescent characteristics, thereby automatically tailoring the specific photoluminescent characteristics of the phosphor product to the requirements of the practitioner. The photoluminescent measuring device can also transmit the photoluminescent data to the autofeedback controller in communication with the microwave reactor, thereby adjusting the first heating stage temperature or the first heating stage residence time in response to the photoluminescent characteristics.

In accordance with a specific embodiment of the invention, the second heating stage is performed in a fluidized bed reactor by fluidizing the precursor complex with a hot gas. In accordance with another specific embodiment of the invention, the second heating stage is performed in the microwave reactor by retaining the precursor complex in the microwave reactor after the first heating stage. The frequency of the microwaves emitted in the microwave reactorduring the second heating stage is adjusted such that a relatively large fraction of the microwaves is absorbed by the precursor complex, creating extremely high local temperatures within the precursor complex. In accordance with this embodiment, the second heating stage residence time or temperature may also be adjusted in response to the particle size or photoluminescent characteristics.

In accordance with either embodiment, a desired phosphor product is recovered from the process outlet, preferably having a relatively small average particle size and narrow particle size distribution, as well as a sufficient luminescent efficiency to satisfy the performance demands of a high resolution display screen for a luminescent display, such as a cathode ray tube, field emission display or a plasma display. The process of the present invention will be further understood from the following detailed description and accompanying drawings.

BRIEF DESCRIPTION OF THE DRAWING

The FIG. 1 is a schematic flowchart of the process of the present invention.

The FIG. 2 is a schematic flowchart of an alternate embodiment of the process of the present invention.

DESCRIPTION OF PREFERRED EMBODIMENTS

The present invention relates to a continuous automated process for manufacturing a phosphor product from selected starting materials. A phosphor product is defined herein as a luminescent composition in solid particulate form having a host lattice providing the primary structure of the composition and having a dopant impregnated in the host lattice structure. The starting materials comprise the selected host lattice precursor and the selected dopant precursor, both of which are preferably provided in solution. The starting materials further comprise a reagent, also preferably provided in solution, that facilitates reaction of the host lattice precursor and the dopant precursor to form the phosphor product as described hereafter. The reagent, however, typically does not become part of the final phosphor product.

Compositions of host lattice precursors having utility in the present invention are substantially any compound capable of reacting to form the host lattice of the desired phosphor product. Such host lattice precursors and their resulting host lattices are well known to the skilled artisan and include certain selected silicates, aluminates, oxides, garnets, gallates, vanadates, tungstates, phosphates, pyrophosphates, fluorides, oxysulfides, yttriates and mixtures thereof. Compositions of dopant precursors having utility in the present invention are substantially any compound capable of reacting to form the dopant of the desired phosphor product. Such dopant precursors and their resulting dopants are well known to the skilled artisan and include certain selected lanthanides, transition metals, and other metals, such as europium, terbium, cerium, manganese, copper, aluminum, gold, silver, and mixtures thereof. As can be appreciated by the skilled artisan, an important criterium for selection of the specific host lattice and dopant precursors is the desired color of light to be emitted by the resulting phosphor product manufactured in accordance with the present process. It is well understood that specific phosphors emit different colored light including red, blue or green light, as well as light of other colors. Compositions of reagents having utility in the present invention are substantially any compound capable of facilitating reaction of the host lattice precursor and the dopant precursor to form the desired phosphor product. Such reagents are well known to the skilled artisan and include certain selected acids, such as oxalic acid.

Figure 1:
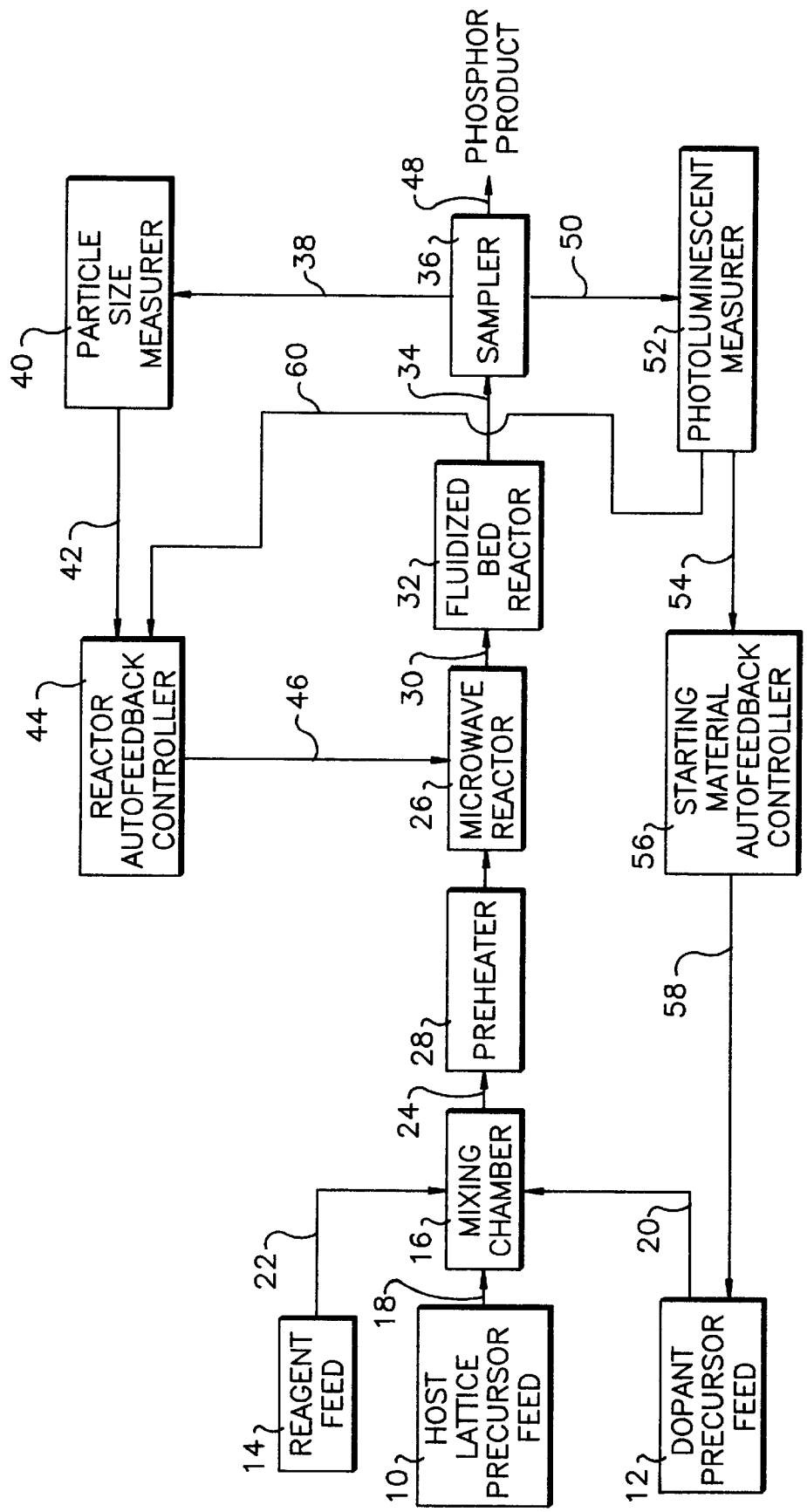

Referring to FIG. 1, the present process is initiated by selecting a host lattice precursor solution, a dopant precursor solution and a reagent solution in accordance with the above-recited criteria. The selected host lattice precursor solution, dopant precursor solution and reagent solution are placed in a host lattice precursor feed device 10, a dopant precursor feed device 12 and a reagent feed device 14, respectively. The feed devices 10, 12, 14 are conventional liquid metering devices and are in fluid communication with a mixing chamber 16 via fluid feed lines 18, 20, 22, respectively. The dopant precursor feed device 12 is preferably an automated metering device, such as an automated fluid control valve, that enables closed loop control of the dopant precursor concentration in the mixing chamber 16. The host lattice precursor solution, dopant precursor solution and reagent solution are metered into the mixing chamber 16 via the fluid feed lines 18, 20, 22, respectively. The mixing chamber 16 is substantially any means of mixing liquids, such as a manifold that joins fluid feed lines 18, 20, 22 into a common starting material mixture line 24. The feed solutions are thoroughly mixed in the mixing chamber 16 to form a liquid starting material mixture. The mole ratio of the host lattice precursor to dopant precursor in the starting material mixture is preferably about 0.1:2. The concentration range of the host lattice precursor in the starting material mixture is preferably about 1M to about 2M, the concentration range of the dopant precursor is preferably about 0.05M to about 0.2M and the concentration range of the reagent is preferably about 2M to about 5M. The starting material mixture is substantially free of any other active species or any contaminant-generating species. As such, the concentration of dopant in the resulting phosphor product typically comprises from about 0.1% to about 20.0% by weight of the phosphor product, the remaining weight percentage of the phosphor product being the host lattice.

The resulting starting material mixture is conveyed via the starting material mixture line 24 to a microwave reactor 26. A conventional preheating device 28 is optionally provided in the starting material mixture line 24 upstream of the microwave reactor 26 to preheat the starting material mixture from ambient temperature to a temperature range between about 20 and about 100° C., if desired. An exemplary microwave reactor having utility herein is model MICRODRY 1V5 produced by Microdry Inc., 7450 Highway 329, Crestwood, Ky. 40014. The starting material mixture is preferably placed in the microwave reactor 26 in a continuous mode with the microwave reactor 26 activated, thereby subjecting the starting material mixture to microwaves therein at a predetermined frequency and for a predetermined time sufficient to elevate the temperature of the starting material mixture to within a range from about 25 to about 100° C. and preferably from about 80 to about 100° C. or higher. A preferred frequency range of operation for the microwave reactor 26 is typically between about 500 and about 2500 MHz, and more preferably between about 1000 and about 2000 MHz. A preferred transient time of the starting material mixture in the microwave reactor 26 is typically between about 10 and about 300 seconds, and more preferably between about 50 and about 100 seconds. Under these conditions, the starting material mixture forms a precursor complex that is a chemical intermediate of the reaction converting the starting material mixture to the phosphor product. The above-recited conditions enable controlled growth of the precursor complex particles such that the precursor complex has an average particle size between about 0.5 and about 2.0 microns, and preferably between about 0.8 and about 2.0 microns. The particle size distribution of the precursor complex is such that the bulk of the precursor complex has individual particle sizes within about 1.5 microns above or below the average particle size of the precursor complex, and preferably within about 1.0 micron.

The precursor complex is removed from the microwave reactor 26 and conveyed via a precursor complex line 30 to a fluidized bed reactor 32. The precursor complex is preferably placed in the fluidized bed reactor 32 in a continuous mode, wherein the fluidized bed reactor 32 is fluidized with a gas, such as $N_2$ or $O_2$, that is at a temperature from about 800 to about 1550° C. The precursor complex is maintained in the fluidized bed reactor 32 for a predetermined time typically between about 1 and 5 minutes sufficient to elevate the temperature of the precursor complex to within a range from about 800 to about 1550° C., and preferably to within a range from about 900 to about 1550° C. Under these conditions, the precursor complex is converted to a phosphor product. The resulting phosphor product is conveyed from the fluidized bed reactor 32 via a phosphor product line 34 to a sampling device 36, wherein pairs of instantaneous phosphor product samples are periodically withdrawn from the phosphor product.

A first instantaneous phosphor product sample is conveyed from the sampling device 36 via a first sample line 38 to a conventional particle size measuring device 40, such as a Coulter counter, model number MULTISIZER IIe produced by Coulter Corporation, P.O. Box 169015, MC 195-10, Miami, Fla. 33116-9015, USA. An alternate particle size measuring device 40 is model number HORIBA LA 900 or LA 910 produced by Horiba, 1080 E. Duane Ave., Suite A, Sunnyvale, Calif. 94086, USA. The particle size measuring device 40 determines the instantaneous particle size characteristics of the phosphor product including the average particle size and the particle size distribution thereof. The resulting particle size data is transmitted via a particle size data communication line 42 to a reactor autofeedback controller 44 in communication with the microwave reactor 26 via a reactor feedback control line 46. The reactor autofeedback controller 44 automatically adjusts the microwave frequency (and correspondingly the reaction temperature) and/or the residence time of the starting material mixture in the microwave reactor 26 in response to the particle size data from the particle size measuring device 40, thereby automatically tailoring the specific particle size characteristics of the phosphor product to the requirements of the practitioner in a manner apparent to the skilled artisan employing the instant teaching. For example, optimal particle size characteristics for a phosphor product used in high resolution display screen applications are typically a relatively small average particle size and narrow particle size distribution.

In general, the growth of the phosphor product particles is controlled in the manner described herein such that the final phosphor product obtained at the process outlet 48 preferably has a predetermined optimal average particle size at or below about 2.0 microns, and more preferably between about 0.8 and about 1.5 microns. The final phosphor product also has a relatively narrow particle size distribution within about 1.0 micron above or below the average particle size of the final phosphor product, and preferably within about 0.5 microns.

The second instantaneous phosphor product sample is conveyed from the sampling device 36 via a second sample line 50 to a conventional photoluminescent measuring device 52, wherein the instantaneous photoluminescent characteristics of the phosphor product are determined, such as the photoluminescent efficiency, photoluminescent luminance, phosphor spectrum and phosphor persistence time. An exemplary photoluminescent measuring device for measuring the above-recited photoluminescent characteristics is a conventional spectrophotometer, such as model number PR-650 or PR-880 produced by Photo Research, 9330 DeSoto Ave., Chatsworth, Calif. 91311, USA, or model number LS-100 produced by Minolta Instruments Systems Division, 101 Williams Drive, Port Elizabeth, N.J. 07449, USA. Model number QUANTAMASTER QM-1 Luminescence Spectrometer produced by Photon Technology International, 1 Deerpark Drive, South Brunswick, N.J. 08852, USA, has specific utility for determining the phosphor persistence time. The crystal structure of the phosphor product, which influences the photoluminescent characteristics thereof, can also be considered a photoluminescent characteristic for purposes of the present process. The crystal structure of the phosphor product is determined by x-ray diffraction techniques using a conventional device, such as model number SCINTAG XDS 2000 Diffractometer produced by Scintag, Inc., Sunnyvale, Calif. 94086, USA.

The resulting photoluminescent data is transmitted via a photoluminescent data communication line 54 to a starting material autofeedback controller 56 in communication with the dopant precursor feed 12 via a dopant precursor feedback control line 58. The starting material autofeedback controller 56 automatically adjusts the amount of the dopant precursor solution metered by the dopant precursor feed 12 to the mixing chamber 16, and correspondingly the relative concentrations of the host lattice and dopant precursor in the starting material mixture, in response to the photoluminescent data, thereby automatically tailoring the specific photoluminescent characteristics of the phosphor product to the requirements of the practitioner in a manner apparent to the skilled artisan employing the instant teaching. In general, it is preferred to adjust the amount of dopant precursor solution such that the photoluminescent luminance of the phosphor product (typically expressed in units of foot-lamberts or candela per square meter) is maximized. For example, a predetermined optimal photoluminescent luminance of red phosphor product $Y_2O_3$:Eu is between about 25 and 30 foot Lamberts (ft-L), a predetermined optimal photoluminescent luminance of a green phosphor product $(Al,Ga)_5O_{12}$:Tb is between about 30 and 35 ft-L, and a predetermined optimal photoluminescent luminance of a blue phosphor product $Y_2S$:$O_5$:Ce is between about 8 and 10 ft-L.

The photoluminescent measuring device 52 can also transmit the photoluminescent data via a photoluminescent data communication line 60 to the reactor autofeedback controller 44. In response thereto, the reactor autofeedback controller 44 automatically adjusts the microwave frequency (and correspondingly the reaction temperature) and/or the residence time of the starting material mixture in the microwave reactor 26 for the purpose of optimizing the photoluminescent characteristics of the phosphor product.

Although not shown herein, it is within the scope of the present invention as is apparent to the skilled artisan to perform the phosphor product sampling step in series rather than in parallel, such that the same instantaneous phosphor product sample is serially conveyed to both the particle size measuring device and photoluminescent measuring device. Alternatively, the sampling device can be omitted from the present process and the particle size measurements and photoluminescent measurements can be performed in-line in a continuous mode at the process outlet. It is further within the scope of the present invention to automatically control the relative concentrations of the host lattice precursor and dopant precursor in the starting material mixture by placing the starting material autofeedback controller in communication with the host lattice precursor feed and adjusting the amount of the host lattice precursor solution metered by the host lattice precursor feed to the mixing chamber in response to the photoluminescent data.

Figure 2:
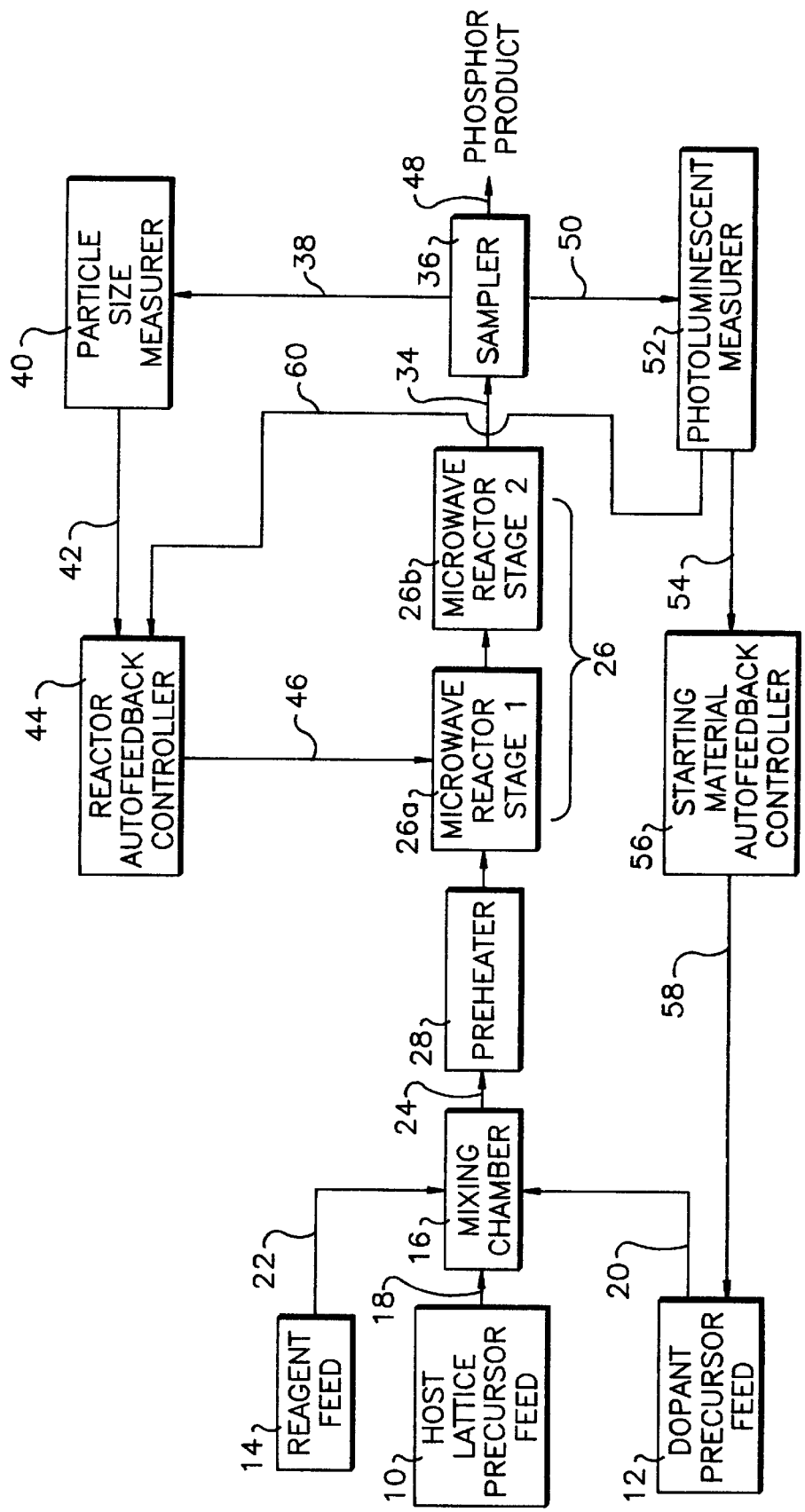

Referring to FIG. 2, an alternate embodiment of the present invention is shown. The embodiment of FIG. 2 is substantially the same as the embodiment of FIG. 1 except that the fluidized bed reactor of FIG. 1 is omitted from the embodiment of FIG. 2. Instead, the first and second heating stages of the process embodied by FIG. 2 are both performed in the microwave reactor 26. Components common to the embodiments of FIGS. 1 and 2 are identified in FIG. 2 by the same reference characters as FIG. 1. It is noted in FIG. 2 that the first and second heating stages are designated by reference characters 26a and 26b, respectively, but it is understood that these first and second heating stages 26a, 26b are performed in the same microwave reactor 26 substantially corresponding to the microwave reactor 26 of FIG. 1.

In accordance with FIG. 2, preparation of the starting material mixture and the first heating stage 26a are performed in substantially the same manner as recited above with reference to FIG. 1. The second heating stage 26b, however, is performed in the same microwave reactor 26. Accordingly, the precursor complex resulting from the first heating stage 26a is maintained in a continuous mode within the microwave reactor 26 during the second heating stage 26b and subjected to microwaves therein at an adjusted predetermined frequency and for an adjusted predetermined residence time sufficient to elevate the temperature of the precursor complex to within a range from about 500 to about 1550° C., and preferably to within a range from about 800 to about 1550° C. A preferred frequency range of operation for the second heating stage 26b is typically between about 900 and about 2500 MHz, and more preferably between about 1000 and about 2000 MHz such that a relatively large fraction of the microwaves is absorbed by the precursor complex. A preferred residence time of the precursor complex in the microwave reactor 26 during the second heating stage 26b is typically between about 1 and about 5 minutes, and more preferably between about 2 and about 4 minutes. Under these conditions, the precursor complex is converted to a phosphor product.

As in the above-described embodiment of FIG. 1, the specific particle size characteristics of the phosphor product in the present embodiment of FIG. 2 are automatically tailored to the requirements of the practitioner by conveying a first instantaneous phosphor product sample from the sampling device 36 to the particle size measuring device 40, transmitting the resulting particle size data to the reactor autofeedback controller 44 in communication with the microwave reactor 26 and adjusting the microwave frequency (and correspondingly the reaction temperature) and reactor residence time of the first and/or second heating stages 26a, 26b in response thereto. Similarly, the specific photoluminescent characteristics of the phosphor product are automatically tailored to the requirements of the practitioner by conveying a second instantaneous phosphor product sample from the sampling device 36 to the photoluminescent measuring device 52, transmitting the resulting photoluminescent data to the starting material autofeedback controller 56 in communication with the dopant precursor feed 12, and adjusting the amount of the dopant precursor solution metered to the mixing chamber 16 in response thereto. The photoluminescent data is also transmitted to the reactor autofeedback controller 44 in communication with the microwave reactor 26 and the microwave frequency (and correspondingly the reaction temperature) and reactor residence time of the first and/or second heating stages 26a, 26b is adjusted in response thereto.

The final phosphor product resulting from either above-described embodiment of the present process has general utility for conventional luminescent display applications, enhancing the performance thereof. The phosphor product, however, has specific utility in the display screens of cathode ray tubes, field emission displays, and plasma displays, wherein high resolution is required. The following examples demonstrates the practice and utility of the present invention, but are not to be construed as limiting the scope thereof.

EXAMPLE 1

A host lattice precursor is selected consisting of $Y(NO_3)_3$ in solution. A dopant precursor is likewise selected consisting of $Eu(NO_3)_3$ in solution. A starting material mixture is prepared containing the host lattice precursor, dopant precursor, and a reagent solution consisting of oxalic acid. The host lattice precursor concentration is 1M and the oxalic acid concentration in the starting material mixture is 2M. A dopant precursor concentration of 0.05M is attained in accordance with the present invention by iteratively modifying an initial dopant precursor concentration under the direction of a dopant precursor metering autofeedback controller receiving photoluminescent luminance data from a spectrophotometer. A predetermined optimal photoluminescent luminance of 25 ft-L is automatically effected in the resulting phosphor product when the above-recited dopant precursor concentration is attained in the reaction mixture. The starting material mixture is conveyed upon formation to an activated microwave reactor emitting microwaves, thereby converting the starting material mixture to a precursor complex having the chemical composition Y and Eu oxalate complex. A microwave frequency of 1000 MHz and a reactor residence time of 30 seconds, producing an elevated starting material mixture temperature of 100° C., are attained in the microwave reactor in accordance with the present invention by iteratively modifying an initial microwave frequency and an initial residence time under the direction of a microwave reactor autofeedback controller receiving particle size data from a Coulter counter. An average particle size of 2.0 microns and individual particle sizes ranging between 0.5 and 3.0 microns is automatically effected in the precursor complex exiting the microwave reactor and a predetermined optimal average particle size of 1.5 microns and particle size distribution of 0.5 microns is automatically effected in the final phosphor product when the above-recited microwave frequency and residence time are attained in the microwave reactor. The precursor complex is conveyed from the microwave reactor to a fluidized bed reactor fluidized by $N_2$ gas at a temperature of 100° C. and a flow rate of 0.001 m/sec. The precursor complex is retained in the fluidized bed reactor for a residence time of 5 minutes, thereby elevating the temperature of the precursor complex to 1250° C. Under these conditions, the precursor complex is converted to a phosphor product having the chemical composition $Y_2O_3$:Eu. The concentration of the dopant in the phosphor product is approximately 5 weight % and the concentration of the host lattice is approximately 95 weight %. As recited above, the phosphor product average particle size is 1.5 microns and the phosphor product particle size distribution is 0.5 microns.

EXAMPLE 2

A host lattice precursor is selected consisting of $Gd(NO_3)_3$ in solution. A dopant precursor is likewise selected consisting of $Eu(NO3)_3$ in solution. A starting material mixture is prepared containing the host lattice precursor, dopant precursor, and a reagent solution consisting of oxalic acid. The host lattice precursor concentration is 1M and the oxalic acid concentration in the starting material mixture is 2M. A dopant precursor concentration of 0.05M is attained in accordance with the present invention by iteratively modifying an initial dopant precursor concentration under the direction of a dopant precursor metering autofeedback controller receiving photoluminescent luminance data from a spectrophotometer. A predetermined optimal photoluminescent luminance is automatically effected in the resulting phosphor product when the above recited dopant precursor concentration is attained in the reaction mixture. The starting material mixture is conveyed upon formation to an activated microwave reactor emitting microwaves, thereby converting the starting material mixture to a precursor complex having the chemical composition Gd and Eu oxalate complex. A microwave frequency of 1250 MHz and a reactor residence time of 30 seconds, producing an elevated starting material mixture temperature of 100° C., are attained in the microwave reactor in accordance with the present invention by iteratively modifying an initial microwave frequency and an initial residence time under the direction of a microwave reactor autofeedback controller receiving particle size data from a Coulter counter. An average particle size of 2.0 microns and individual particle sizes ranging between 0.5 and 3.0 microns is automatically effected in the precursor complex when the above-recited microwave frequency and residence time are attained in the microwave reactor. The precursor complex is maintained in the microwave reactor and a microwave frequency of 2450 MHz and a reactor residence time of 5 minutes, producing an elevated precursor complex temperature of 1250° C., are attained in the microwave reactor in accordance with the present invention by iteratively modifying the microwave frequency and residence time under the direction of the microwave reactor autofeedback controller. A predetermined optimal average particle size of 1.5 microns and particle size distribution of 0.5 microns is automatically effected in the final phosphor product when the above-recited microwave frequency and residence time are attained in the microwave reactor. Under these conditions, the precursor complex is converted to a phosphor product having the chemical composition $Gd_2O_3$:Eu. The concentration of the dopant in the phosphor product is approximately 5 weight % and the concentration of the host lattice is approximately 95 weight %. As recited above, the phosphor product average particle size is 1.5 microns and the phosphor product particle size distribution is 0.5 microns.

While the forgoing preferred embodiments of the invention have been described and shown, it is understood that alternatives and modifications, such as those suggested and others, may be made thereto and fall within the scope of the present invention. For example, the phosphor product has been described herein as comprising a host lattice and a dopant prepared from a single host lattice precursor composition and a single dopant precursor composition, respectively. It is understood, however, that it is within the scope of the present invention to prepare a phosphor product in the above-described manner from a plurality of host lattice precursor compositions and/or dopant precursor compositions. In particular, a given phosphor product may be produced from a plurality of dopant precursor compositions such that the resulting phosphor product contains a plurality of dopants, wherein at least one of the dopants is a sensitizer to at least one of the other dopants that is a light emitter, e.g., the phosphor product $Y_3Al_5O_{12}$:Tb, Ce has two dopants, wherein Ce is a sensitizer to the light emitter Tb thereby enhancing the efficiency of the resulting phosphor product.

The present process has further been described herein as practiced in a continuous mode, but it is understood that within the scope of the present invention the process can be practiced in a batch mode.

I claim:

1. A process for preparing a phosphor product comprising:

selecting a starting material mixture comprising a host lattice precursor and a dopant precursor;

subjecting said starting material mixture to microwaves, thereby heating said starting material mixture in a first heating stage for a first heating stage residence time and to a first heating stage temperature sufficient to form a precursor complex from said starting material mixture;

heating said precursor complex in a second heating stage for a second heating stage residence time and to a second heating stage temperature sufficient to form a phosphor product from said precursor complex, wherein said phosphor product comprises a host lattice and a dopant; and measuring a particle size characteristic of said phosphor product and adjusting said first heating stage residence time or said first heating stage temperature in response to said particle size characteristic.

2. A process as recited in claim 1, wherein said first heating stage residence time or said first heating stage temperature is adjusted by means of a reactor autofeedback controller.

3. A process as recited in claim 1, further comprising measuring a photoluminescent characteristic of said phosphor product and adjusting the relative concentrations of said host lattice precursor and said dopant precursor in said starting material mixture in response to said photoluminescent characteristic.

4. A process as recited in claim 3, wherein said relative concentrations of host lattice precursor and said dopant precursor in said starting material mixture are adjusted by a starting material autofeedback controller.

5. A process as recited in claim 1, wherein said microwaves of said first heating stage have a frequency between about 500 and about 2500 MHZ.

6. A process as recited in claim 1, wherein said temperature of said first heating stage is between about 80 and about 100° C.

7. A process as recited in claim 1, wherein said temperature of said second heating stage is between about 800 and about 1550° C.

8. A process as recited in claim 1, wherein said starting material mixture is subjected to said microwaves in said first heating stage for a time between about 50 seconds and about 100 seconds.

9. A process as recited in claim 1, wherein said microwaves in said first heating stage are a first set of microwaves, and further wherein said second heating stage comprises subjecting said precursor complex to a second set of microwaves at said second heating stage temperature between about 800 and about 1550° C.

10. A process as recited in claim 9, wherein said precursor complex is subjected to said second set of microwaves in said second heating stage for a time between about 1 minute and about 5 minutes.

11. A process as recited in claim 9, wherein said second set of microwaves of said second heating stage have a frequency between about 900 and about 2500 MHZ.

12. A process as recited in claim 1, wherein said second heating stage comprises heating said precursor complex in a fluidized bed reactor containing a fluidizing gas having a temperature between about 800 and about 1550° C.

13. A process as recited in claim 12, wherein said precursor complex is maintained in said fluidized bed reactor for a time between about 1 minute and about 5 minutes.

14. A process as recited in claim 1, wherein said phosphor product has an average particle size between about 0.8 and about 2.0 microns.

15. A process as recited in claim 1, wherein said phosphor product has a particle size distribution of about 1.0 micron above or below the average particle size of the phosphor product.

16. A process for preparing a phosphor product comprising:
    selecting a starting material mixture comprising a host lattice precursor and a dopant precursor;
    subjecting said starting material mixture to microwaves, thereby heating said starting material mixture in a first heating stage for a first heating stage residence time and to a first heating stage temperature sufficient to form a precursor complex from said starting material mixture;
    heating said precursor complex in a second heating stage for a second heating stage residence time and to a second heating stage temperature sufficient to form a phosphor product from said precursor complex, wherein said phosphor product comprises a host lattice and a dopant; and
    measuring a photoluminescent characteristic of said phosphor product and adjusting said first heating stage residence time or said first heating stage temperature in response to said photoluminescent characteristic.

17. A process as recited in claim 16, wherein said first heating stage residence time or said first heating stage temperature is adjusted by means of a reactor autofeedback controller.

18. A process for preparing a phosphor product comprising:
    selecting a starting material mixture comprising a host lattice precursor and a dopant precursor;
    subjecting said starting material mixture to microwaves, thereby heating said starting material mixture in a first heating stage for a first heating stage residence time and to a first heating stage temperature sufficient to form a precursor complex from said starting material mixture;
    placing said precursor complex in a fluidized bed reactor and heating said precursor complex in a second heating stage to a second heating stage temperature sufficient to form a phosphor product from said precursor complex, wherein said phosphor product comprises a host lattice and a dopant; and
    measuring a particle size characteristic of said phosphor product and adjusting said first heating stage residence time or said first heating stage temperature in response to said particle size characteristic.

19. A process for preparing a phosphor product having controlled particle size characteristics comprising:
    selecting a starting material mixture comprising a host lattice precursor and a dopant precursor;
    subjecting said starting material mixture to a first set of microwaves, thereby heating said starting material mixture in a first heating stage for a first heating stage residence time and to a first heating stage temperature sufficient to form a precursor complex from said starting material mixture;
    subjecting said starting material to a second set of microwaves, thereby heating said precursor complex in a second heating stage to a temperature sufficient to form a phosphor product from said precursor complex, wherein said phosphor product comprises a host lattice and a dopant; and
    measuring a particle size characteristic of said phosphor product and adjusting said first heating stage residence time or said first heating stage temperature in response to said particle size characteristic.

20. A process for preparing a phosphor product comprising:
    selecting a starting material mixture comprising a host lattice precursor and a dopant precursor;
    subjecting said starting material mixture to microwaves, thereby heating said starting material mixture in a first heating stage for a first heating stage residence time and to a first heating stage temperature sufficient to form a precursor complex from said starting material mixture;
    placing said precursor complex in a fluidized bed reactor and heating said precursor complex in a second heating stage to a second heating stage temperature sufficient to form a phosphor product from said precursor complex, wherein said phosphor product comprises a host lattice and a dopant; and
    measuring a photoluminescent characteristic of said phosphor product and adjusting said first heating stage residence time or said first heating stage temperature in response to said photoluminescent characteristic.

21. A process for preparing a phosphor product comprising:
    selecting a starting material mixture comprising a host lattice precursor and a dopant precursor;
    subjecting said starting material mixture to microwaves, thereby heating said starting material mixture in a first heating stage to a temperature sufficient to form a precursor complex from said starting material mixture; and placing said precursor complex in a fluidized bed reactor and heating said precursor complex in a second heating stage to a temperature sufficient to form a phosphor product from said precursor complex, wherein said phosphor product has an average particle size between about 0.8 and about 2.0 microns and comprises a host lattice and a dopant.

22. A process for preparing a phosphor product comprising:

selecting a starting material mixture comprising a host lattice precursor and a dopant precursor;

subjecting said starting material mixture to microwaves, thereby heating said starting material mixture in a first heating stage to a temperature sufficient to form a precursor complex from said starting material mixture; and placing said precursor complex in a fluidized bed reactor and heating said precursor complex in a second heating stage to a temperature sufficient to form a phosphor product from said precursor complex, wherein said phosphor product has a particle size distribution of about 1.0 micron above or below the average particle size of the phosphor product and comprises a host lattice and a dopant.

23. A process for preparing a phosphor product having controlled particle size characteristics comprising:

selecting a starting material mixture comprising a host lattice precursor and a dopant precursor;

subjecting said starting material mixture to a first set of microwaves, thereby heating said starting material mixture in a first heating stage for a first heating stage residence time and to a first heating stage temperature sufficient to form a precursor complex from said starting material mixture;

subjecting said starting material to a second set of microwaves, thereby heating said precursor complex in a second heating stage to a second heating stage temperature sufficient to form a phosphor product from said precursor complex, wherein said phosphor product comprises a host lattice and a dopant; and measuring a photoluminescent characteristic of said phosphor product and adjusting said first heating stage residence time or said first heating stage temperature in response to said photoluminescent characteristic.

24. A process for preparing a phosphor product having controlled particle size characteristics comprising:

selecting a starting material mixture comprising a host lattice precursor and a dopant precursor;

subjecting said starting material mixture to a first set of microwaves, thereby heating said starting material mixture in a first heating stage to a temperature sufficient to form a precursor complex from said starting material mixture; and subjecting said starting material to a second set of microwaves, thereby heating said precursor complex in a second heating stage to a temperature sufficient to form a phosphor product from said precursor complex, wherein said phosphor product has an average particle size between about 0.8 and about 2.0 microns and comprises a host lattice and a dopant.

25. A process for preparing a phosphor product having controlled particle size characteristics comprising:

selecting a starting material mixture comprising a host lattice precursor and a dopant precursor;

subjecting said starting material mixture to a first set of microwaves, thereby heating said starting material mixture in a first heating stage to a temperature sufficient to form a precursor complex from said starting material mixture; and subjecting said starting material to a second set of microwaves, thereby heating said precursor complex in a second heating stage to a temperature sufficient to form a phosphor product from said precursor complex, wherein said phosphor product has a particle size distribution of about 1.0 micron above or below the average particle size of the phosphor product and comprises a host lattice and a dopant.

26. A process for preparing a phosphor product having controlled particle size characteristics comprising:

selecting a starting material mixture comprising a host lattice precursor and a dopant precursor;

subjecting said starting material mixture to a first set of microwaves, thereby heating said starting material mixture in a first heating stage to a temperature sufficient to form a precursor complex from said starting material mixture; and subjecting said starting material to a second set of microwaves, thereby heating said precursor complex in a second heating stage for a time between about 1 minute and about 5 minutes to a temperature sufficient to form a phosphor product from said precursor complex, wherein said phosphor product comprises a host lattice and a dopant.

* * * * *